United States Patent
Beamish et al.

(10) Patent No.: US 7,647,028 B2
(45) Date of Patent: Jan. 12, 2010

(54) INTERNAL CALIBRATION SYSTEM FOR A RADIO FREQUENCY (RF) TRANSMITTER

(75) Inventors: Norman J. Beamish, Costa Mesa, CA (US); Morten Damgaard, Laguna Hills, CA (US); William J. Domino, Yorba Linda, CA (US)

(73) Assignee: Skyworks Solutions, Inc., Woburn, MA (US)

( * ) Notice: Subject to any disclaimer, the term of this patent is extended or adjusted under 35 U.S.C. 154(b) by 647 days.

(21) Appl. No.: 11/100,172

(22) Filed: Apr. 6, 2005

(65) Prior Publication Data

US 2006/0252392 A1    Nov. 9, 2006

(51) Int. Cl.
*H04B 1/04* (2006.01)
(52) U.S. Cl. .................. 455/126; 455/108; 455/114.2; 455/115.1; 455/115.3; 375/296; 375/298
(58) Field of Classification Search ................ 455/126, 455/108, 114.2, 115.1, 115.3, 295, 296, 67.11; 375/296, 298, 308, 224
See application file for complete search history.

(56) References Cited

U.S. PATENT DOCUMENTS

| | | | |
|---|---|---|---|
| 4,009,347 A | | 2/1977 | Flemming et al. |
| 4,466,106 A | * | 8/1984 | Serrano ................ 375/223 |
| 4,488,155 A | * | 12/1984 | Wu ..................... 342/376 |
| 4,795,989 A | * | 1/1989 | Hart et al. ............ 333/116 |
| 5,745,011 A | * | 4/1998 | Scott ................... 331/44 |
| 5,770,971 A | * | 6/1998 | McNicol ............... 330/52 |
| 5,894,496 A | * | 4/1999 | Jones ................... 455/126 |
| 6,101,399 A | * | 8/2000 | Raleigh et al. ......... 455/561 |
| 6,198,246 B1 | * | 3/2001 | Yutkowitz .............. 318/561 |
| 6,259,221 B1 | * | 7/2001 | Yutkowitz .............. 318/561 |
| 6,665,545 B1 | * | 12/2003 | Raleigh et al. ......... 455/562.1 |
| 6,668,024 B1 | * | 12/2003 | Andre ................... 375/295 |
| 6,819,910 B2 | * | 11/2004 | Shi et al. .............. 455/126 |
| 6,834,255 B2 | * | 12/2004 | Abrosimov et al. ..... 702/181 |
| 7,110,469 B2 | * | 9/2006 | Shi et al. .............. 375/295 |
| 7,130,589 B2 | * | 10/2006 | Lee et al. .............. 455/67.11 |
| 7,181,205 B1 | * | 2/2007 | Scott et al. ............. 455/423 |
| 7,203,472 B2 | * | 4/2007 | Seppinen et al. ....... 455/226.1 |
| 2001/0056332 A1 | * | 12/2001 | Abrosimov et al. ...... 702/89 |
| 2003/0169827 A1 | * | 9/2003 | Shi et al. .............. 375/295 |
| 2003/0171110 A1 | * | 9/2003 | Shi et al. .............. 455/324 |
| 2004/0104857 A1 | * | 6/2004 | Kaindl .................. 343/703 |
| 2004/0106380 A1 | | 6/2004 | Vassiliou |
| 2004/0198340 A1 | * | 10/2004 | Lee et al. .............. 455/423 |
| 2005/0059361 A1 | * | 3/2005 | Shi et al. .............. 455/115.1 |
| 2005/0070233 A1 | | 3/2005 | Sowlati |
| 2006/0218616 A1 | * | 9/2006 | Schemmann et al. ..... 725/129 |
| 2007/0242854 A1 | * | 10/2007 | Rattan et al. ........... 382/100 |

* cited by examiner

*Primary Examiner*—Minh D Dao

(57) ABSTRACT

An internal calibration system for a radio frequency (RF) transmitter comprises a digital processing element to generate within a radio frequency (RF) transmitter test points at which an output of the RF transmitter is measured, an RF detector to measure the radio frequency output of the RF transmitter at the test points, the digital processing element also determining transmitter impairments by analyzing the measured radio frequency output, and compensation circuitry to compensate the RF transmitter for the measured impairments.

15 Claims, 10 Drawing Sheets

INTERNAL CALIBRATION SYSTEM FOR A RADIO FREQUENCY (RF) TRANSMITTER

BACKGROUND OF THE INVENTION

1. Field of the Invention

This invention relates generally to transceiver architecture in a wireless portable communication device. More particularly, the invention relates to an internal calibration system for a radio frequency (RF) transmitter.

2. Related Art

Radio frequency (RF) transmitters are found in many one-way and two-way communication devices, such as portable communication devices, (cellular telephones), personal digital assistants (PDAs) and other communication devices. An RF transmitter must transmit using whatever communication methodology is dictated by the particular communication system within which it is operating. For example, communication methodologies typically include amplitude modulation, frequency modulation, phase modulation, or a combination of these. However, RF transmitters are imperfect electronic devices and suffer impairments from a variety of sources. For example, common transmitter impairments include gain imbalance, phase imbalance and direct current (DC) offset as it relates to the in-phase (I) and quadrature-phase (Q) components of a transmit signal.

These and other impairments are compensated today during manufacture of an RF transmitter and typically involve setting the transmitter to send a known signal, which can be, for example, a sinusoid. This known signal is examined by external test equipment and compared with the expected signal. The transmitter is adjusted using information extracted from the examined test signal. Unfortunately, this is a time consuming process that requires external test and measurement equipment.

Another prior solution to compensate for transmitter impairments monitors the output of a transmit voltage controlled oscillator (VCO) using receiver circuitry located in the same device as the transmit circuitry. Unfortunately, this technique requires significant area on the device to achieve the required amplification levels. This technique also only measures a small portion of the overall transmit chain by inferring the performance of the transmitter by analyzing the output of the VCO, thus ignoring impairments that may be added by other components in the transmit chain.

Another prior technique for analyzing and compensating transmitter impairments routes the transmitter output directly to receiver circuitry on the device so the receiver circuitry can observe the transmit signal. Unfortunately, in a time division multiple access (TDMA) communication system, such as the Global system for Mobile Communication (GSM), there is normally no full duplex transmit/receive capability, thus making this technique difficult and expensive to perform.

Therefore, it would be desirable to efficiently and quickly detect and compensate transmitter impairments in a communication device.

SUMMARY

Embodiments of the invention include an internal calibration system for a radio frequency (RF) transmitter, comprising a digital processing element to generate within a radio frequency (RF) transmitter test points at which an output of the RF transmitter is measured, an RF detector to measure the radio frequency output of the RF transmitter at the test points, the digital processing element also determining transmitter impairments by analyzing the measured radio frequency output, and compensation circuitry to compensate the RF transmitter for the measured impairments.

Related methods of operation are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The invention can be better understood with reference to the following figures. The components within the figures are not necessarily to scale, emphasis instead being placed upon clearly illustrating the principles of the invention. Moreover, in the figures, like reference numerals designate corresponding parts throughout the different views.

DETAILED DESCRIPTION

Figure 1A:
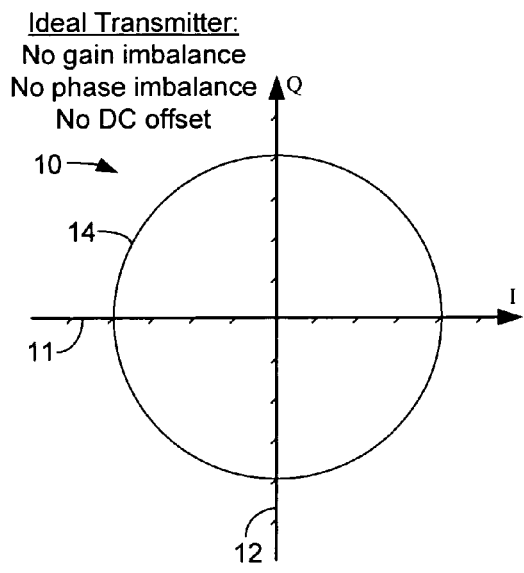
FIGS. 1A through 1E are schematic diagrams illustrating signal space diagrams showing ideal and impaired transmit signal parameters.

Although described with particular reference to the global system for mobile communication (GSM) communication methodology, the internal calibration system for a radio frequency (RF) transmitter (hereafter referred to as the "internal calibration system") can be implemented in any communication device having a transmitter which uses an I-Q baseband modulator.

The internal calibration system can be implemented in hardware, software, or a combination of hardware and software. When implemented in hardware, the internal calibration system can be implemented using specialized hardware elements and logic. When the internal calibration system is implemented partially in software, the software portion can be used to measure transmit power, process the measured transmit power signal and control the compensation circuitry to remove or reduce the effect of transmitter impairments. The software can be stored in a memory and executed by a suitable instruction execution system (microprocessor). The hardware implementation of the internal calibration system can include any or a combination of the following technologies, which are all well known in the art: discrete electronic components, a discrete logic circuit(s) having logic gates for implementing logic functions upon data signals, an application specific integrated circuit having appropriate logic gates, a programmable gate array(s) (PGA), a field programmable gate array (FPGA), etc.

The software for the internal calibration system comprises an ordered listing of executable instructions for implementing logical functions, and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance, optical scanning of the paper or other medium, then compiled, interpreted or otherwise processed in a suitable manner if necessary, and then stored in a computer memory.

FIG. 1A is a signal space diagram 10 illustrating the in-phase (I) and quadrature-phase (Q) portions of a constant envelope (i.e., no modulation-induced amplitude variation) transmit signal. The horizontal axis 11 represents the in-phase portion of the signal and the vertical axis 12 represents the quadrature-phase portion of the signal. The signal space diagram 10 represents the output of an ideal transmitter and is represented using the unit circle 14. The unit circle 14 has an exemplary magnitude of one (1) on the in-phase axis 11 and on the quadrature axis 12. The signal space diagram 10 represents an ideal transmitter having zero gain imbalance, zero phase imbalance, and no DC offset. While the exemplary value magnitude of unity (1) is described, it is noted that unity scaling is not essential. The value of unity is arbitrarily chosen for this explanation.

Figure 1B:
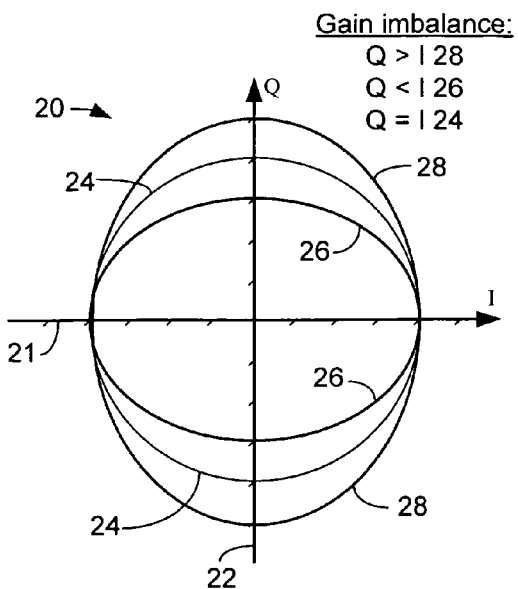

FIG. 1B is a signal space diagram 20 illustrating the output of a transmitter having gain imbalance. The unit circle 14 of FIG. 1A is shown as unit circle 24 in FIG. 1B for reference. The transmitter impairments shown in FIG. 1B are illustrated by the transmitter output 26, which shows a gain imbalance caused when the gain associated with the quadrature (Q) component of the transmit signal is less than the gain associated with the in-phase (I) component of the transmit signal. The transmitter output 28 shows the gain imbalance when the gain associated with the quadrature (Q) component of the transmit signal is larger than the gain associated with the in-phase (I) component of the transmit signal.

Figure 1C:
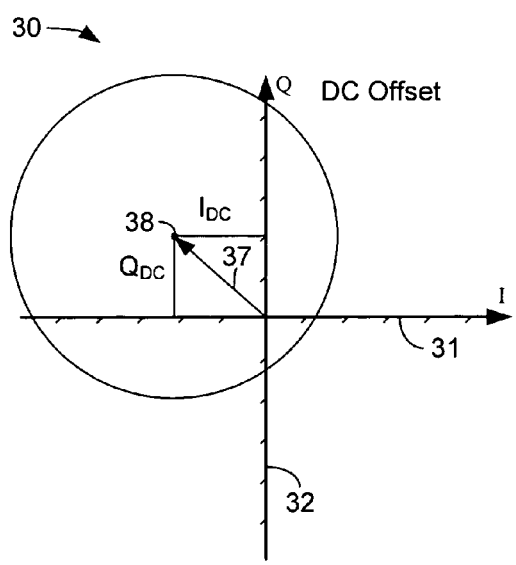

FIG. 1C is a signal space diagram 30 illustrating the output of a transmitter having DC offset. The DC offset is represented by vector 37 having an in-phase DC offset component ($I_{DC}$) and a quadrature-phase DC offset component ($Q_{DC}$), resulting in the point 38. The point 38 terminates the DC offset vector and becomes the center of the unit circle 34.

Figure 1D:
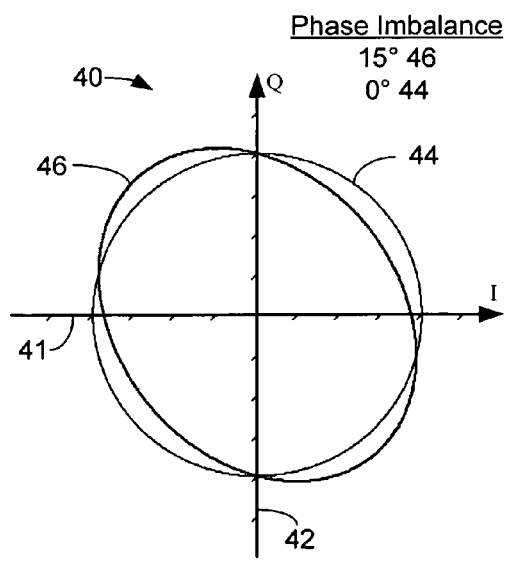

FIG. 1D is a signal space diagram 40 illustrating the output of a transmitter having phase imbalance. The unit circle of an ideal transmitter is shown using reference numeral 44, while the output of a transmitter suffering from a phase imbalance impairment is shown at reference numeral 46. For exemplary purposes only, the transmitter output 46 is shown with a 15° phase imbalance.

Figure 1E:
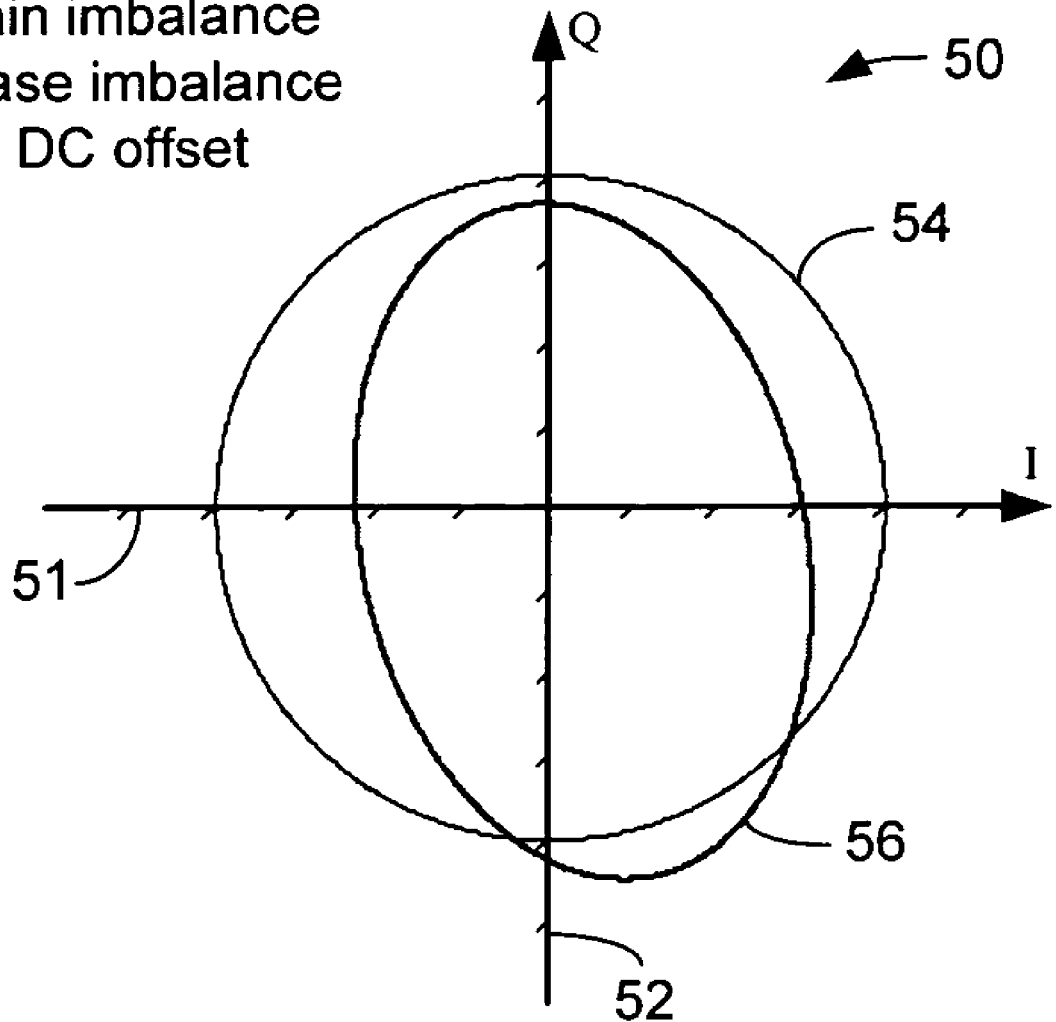

FIG. 1E is a signal space diagram 40 illustrating the output of a real transmitter having a gain imbalance, a phase imbalance, and a DC offset. The unit circle of an ideal transmitter is shown at 54 while the output of the impaired transmitter is shown using reference numeral 56. In accordance with embodiments of the invention, to be described below, the impairments of gain imbalance, phase imbalance, and DC offset to a real-world (i.e., impaired) transmitter are detected and compensated by the digital compensation circuitry to be described below.

Figure 2:
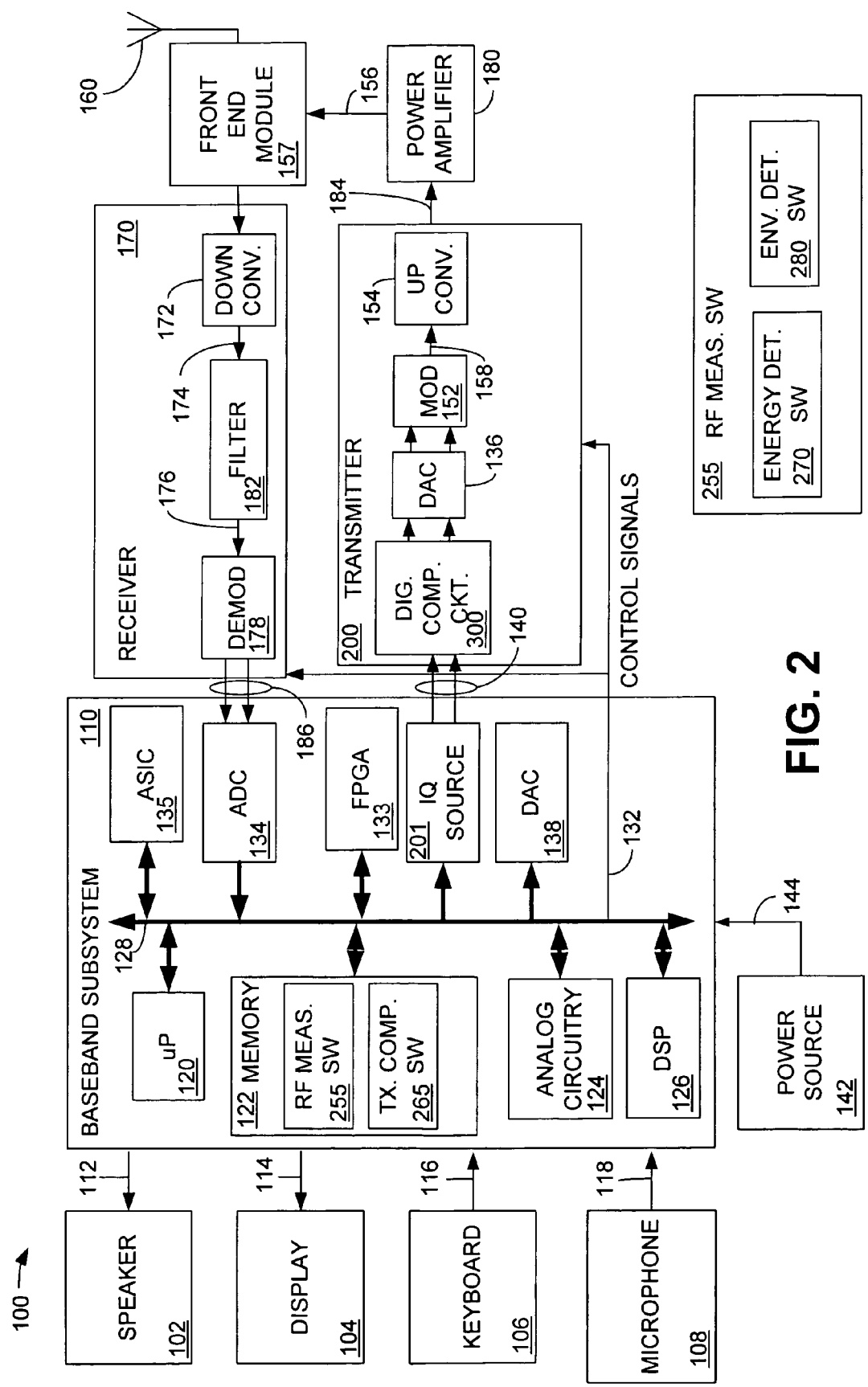
FIG. 2 is a block diagram illustrating a simplified portable transceiver.

FIG. 2 is a block diagram illustrating a simplified portable transceiver 100 including a transmitter having the internal calibration system. The portable transceiver 100 includes speaker 102, display 104, keyboard 106, and microphone 108, all connected to baseband subsystem 110. A power source 142, which may be a direct current (DC) battery or other power source, is also connected to the baseband subsystem 110 via connection 144 to provide power to the portable transceiver 100. In a particular embodiment, portable transceiver 100 can be, for example but not limited to, a portable telecommunication handset such as a mobile cellular-type device. Speaker 102 and display 104 receive signals from baseband subsystem 110 via connections 112 and 114, respectively, as known to those skilled in the art. Similarly, keyboard 106 and microphone 108 supply signals to baseband subsystem 110 via connections 116 and 118, respectively. Baseband subsystem 110 includes microprocessor (μP) 120, memory 122, analog circuitry 124, and digital signal processor (DSP) 126 in communication via bus 128. Bus 128, although shown as a single bus, may be implemented using multiple busses connected as necessary among the subsystems within baseband subsystem 110.

Depending on the manner in which the internal calibration system is implemented, the baseband subsystem 110 may also include an application specific integrated circuit (ASIC) 135 and/or a field programmable gate array (FPGA) 133.

Microprocessor 120 and memory 122 provide the signal timing, processing and storage functions for portable transceiver 100. Analog circuitry 124 provides the analog processing functions for the signals within baseband subsystem 110. An analog-to-digital converter (ADC) 134 provides an interface from the receiver 170 to the baseband subsystem 110. The digital-to-analog converter (DAC) 138 provides an interface from baseband subsystem 110 to any auxiliary functions where an analog signal is required. Baseband subsystem 110 provides control signals to transmitter 200 and receiver 170 via connection 132. The control signals on connection 132 may originate from the DSP 126, the ASIC 135, the FPGA 133, or from microprocessor 120, or other components, and are supplied to a variety of connections within the transmitter 200, the receiver 170 and other components. It should be noted that, for simplicity, only the basic components of portable transceiver 100 are illustrated herein. The control signals provided by the baseband subsystem 110 control the various components within the transmitter 200, the receiver 170 and other components. Further, the function of the transmitter 200 and the receiver 170 may be integrated into a transceiver.

If portions of the internal calibration system are implemented in software that is executed by the microprocessor 120, or another device, the memory 122 will also include RF measurement software 255 and transmitter compensation software 265. Depending on the manner in which the internal calibration system is implemented, the RF measurement software may include energy detector software 270 and envelope detector software 280. The RF measurement software 255 and the transmit compensation software 265 comprise one or more executable code segments that can be stored in the memory and executed in the microprocessor 120 or another device. Alternatively, the functionality of the RF measurement software 255 and the transmitter compensation software 265 can be coded into the ASIC 135 or can be executed by the FPGA 133. Because the memory 122 can be rewritable and because the FPGA 133 is reprogrammable, updates to the RF measurement software 255 and the transmitter compensation software 265 can be remotely sent to and saved in the portable transceiver 100 when implemented using either of these methodologies.

The baseband subsystem 110 also includes an I-Q source 201. The I-Q source 201 converts the digital communication information within baseband subsystem 110 into an appropriate format for transfer to the transmitter 200 via connection 140. Connection 140, while shown as two directed arrows, includes the digital information that is to be transmitted by the transmitter 200 after conversion from the digital domain to the analog domain.

The transmitter 200 includes digital compensation circuitry 300, which compensates for the impairments of gain imbalance, phase imbalance, and DC offset in accordance with embodiments of the invention. The digital compensation circuitry 300 is connected to a DAC 136, which in turn provides the analog I and Q signals to the modulator 152. While the DAC 136 is shown in FIG. 2 as a single block, the DAC 136 may include either two DACs, one for the I component of the signal and one for the Q component of the signal, or may include a single DAC operating at twice speed with a switching function that makes the single DAC appear or to maintain the functionality of two DACs. The modulator 152 modulates a carrier signal with the analog I and Q information provided by the DAC 136 and provides a modulated signal via connection 158 to an upconverter 154. The upconverter 154 transforms the modulated signal on connection 158 to an appropriate transmit frequency and provides the upconverted signal to a power amplifier 180 via connection 184. In one embodiment the compensation circuitry 300 may operate on the digital I-Q signal prior to the DACs 136, as shown in FIG. 2. In an alternative embodiment, not shown here, the compensation circuitry operates in the analog domain subsequent to the conversion of the digital I-Q signal by the DAC 136.

The power amplifier 180 amplifies the signal to an appropriate power level for the system in which the portable transceiver 100 is designed to operate. Details of the modulator 152 and the upconverter 154 have been omitted for simplicity, as they will be understood by those skilled in the art. For example, the data on connection 140 is generally formatted by the baseband subsystem 110 into in-phase (I) and quadrature (Q) components. The I and Q components may take different forms and be formatted differently depending upon the communication standard being employed.

The power amplifier 180 supplies the amplifier signal via connection 156 to front end module (FEM) 157. The front end module 157 typically includes a diplexer for separating frequency bands, one or more transmit-receive switches for directing the transmit and receive signals to the transmit and receive circuitry, respectively, and includes various transmit and receive filters. Alternatively, an antenna switch module (ASM) may be implemented in place of the FEM 157, in which case the transmit and receive filters are located elsewhere.

A signal received by antenna 160 will be directed from the FEM 157 to the receiver 170. The receiver 170 includes a downconverter 172, one or more filters 182, and a demodulator 178. If implemented using a direct conversion receiver (DCR), the downconverter 172 converts the received signal from an RF level to a baseband level (DC). Alternatively, the received RF signal may be downconverted to an intermediate frequency (IF) signal, depending on the application. The downconverted signal is sent to the filter 182 via connection 174. The filter comprises a least one filter stage to filter the received downconverted signal as known in the art.

The filtered signal is sent from the filter 182 via connection 176 to the demodulator 178. The demodulator 178 recovers the transmitted analog information and supplies a signal representing this information via connection 186 to ADC 134. ADC 134 converts these analog signals to a digital signal at baseband frequency and transfers the signal via bus 128 to DSP 126 for further processing.

Figure 3:
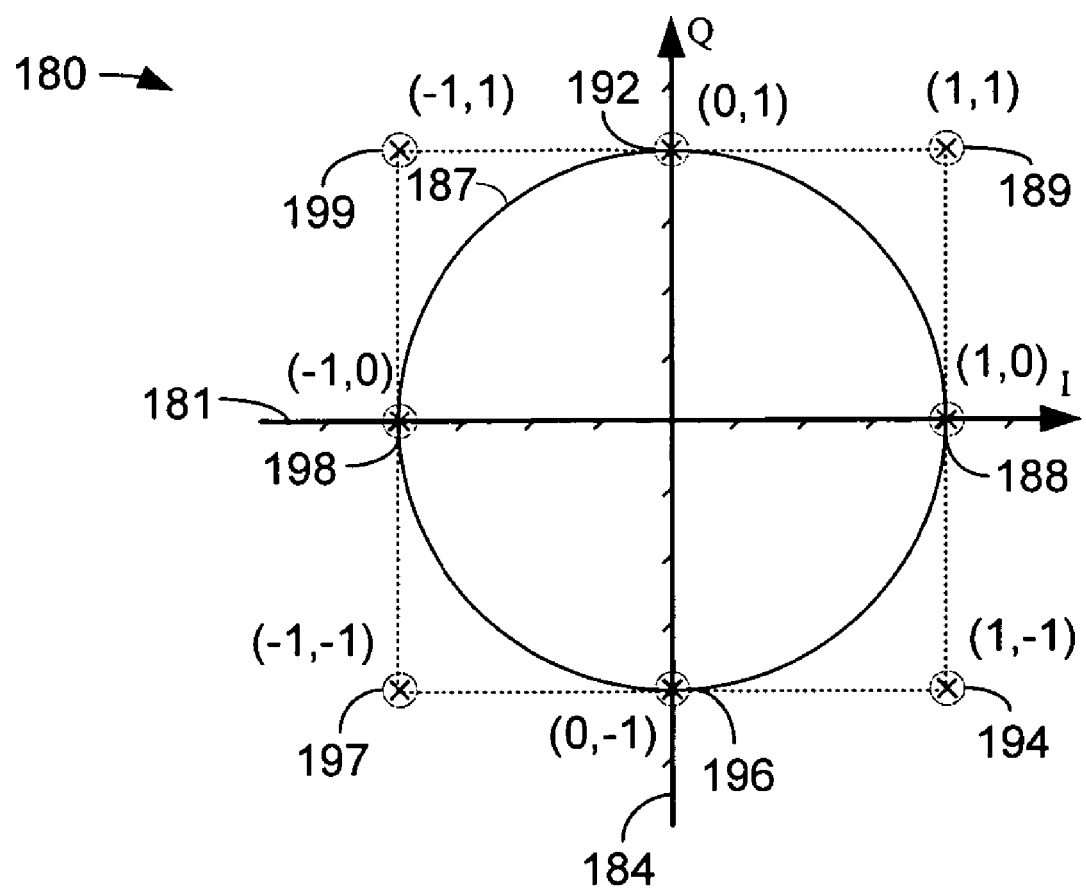
FIG. 3 is a schematic diagram illustrating a signal space diagram showing possible test points to be used with the internal calibration system.

FIG. 3 is a schematic diagram illustrating a signal space diagram 180 showing possible test points to be used with the internal calibration system. The horizontal axis 181 represents the in-phase (I) component of a transmit signal and the vertical axis 184 represents the quadrature (Q) component of a transmit signal. The unit circle 187 illustrates a nominal scaled value of 1 for the in-phase and quadrature-phase components of the transmit signal.

A first test point 188 is located at a point on the signal space diagram 180 in which the value of I is one and the value of Q is zero (1, 0). The nomenclature (I,Q) refers to the respective in-phase and quadrature-phase values at which the test point is located on the signal space diagram 180. A second test point 189 is located at a point on the signal space diagram 180 in which the value of I is one and the value of Q is one (1, 1). A third test point 192 is located at position (0, 1), a fourth test point 196 is located at the position (0, −1), a fifth test point 197 is located at the position (−1, −1), and a sixth test point 198 is located at the position (−1, 0). Two additional points (194, located at (1, −1) and 199, located at (−1, 1)) are available test points but will not be used in the description that follows. It will be immediately apparent that these test points lie on the perimeter of a square trajectory in signal space and in particular, that they can be grouped into two distinct subgroups. A first subgroup includes the points 189, 199, 197 and 194 located at the corners of the square. A second subgroup includes the points 192, 198, 196 and 188 located at the points of intersection between the square trajectory and the I-Q coordinate axes.

As shown in FIG. 3, the test points all reside on a square in the signal space. In a practical implementation it may be desirable to limit the amplitude of the signal envelope. For example, in a constant envelope modulated signal the I and Q points all exist on a circular trajectory as shown in FIG. 1A. If the radius of this circle is defined as unity (magnitude=1) then it follows that the square trajectory will, at its corners, be a distance of sqrt(2) from the origin. This is the amplitude of the IQ point. In a real system the transmitted power is proportional to this amplitude of the IQ point. Furthermore, in a system designed for constant envelope signals with unity amplitude, signals with amplitude greater than unity may dictate that some portions of the RF circuitry operate in a region of higher non-linearity than the nominal operating point (amplitude=1). Therefore, the entire square trajectory may be scaled so that it lies within the circle having a unity radius. It should be mentioned that unity scaling is arbitrarily chosen.

Figure 4:
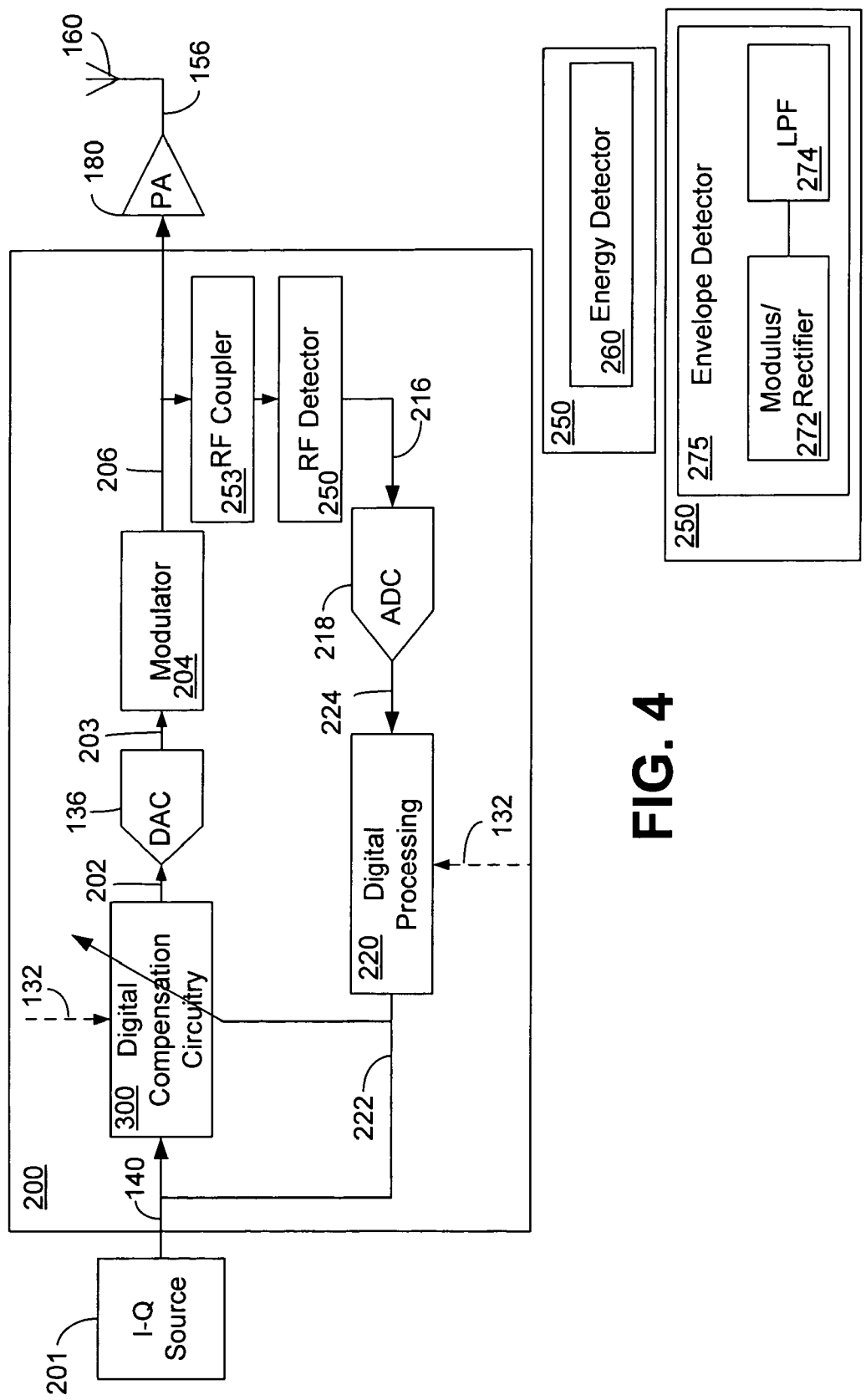
FIG. 4 is a schematic diagram illustrating the transmitter of FIG. 2 in greater detail.

FIG. 4 is a schematic diagram illustrating the transmitter 200 of FIG. 2 in greater detail. The transmitter 200 is supplied by a source 201 for generating the in-phase (I) and quadrature-phase (Q) components of the transmit signal. The output of the I-Q source 201 is supplied via connection 140 to the digital compensation circuitry 300. Connection 140 is shown schematically as a single line, though it is understood that it may comprised one or more lines. The digital compensation circuitry 300 will be described in greater detail below in FIG. 5. The digital compensation circuitry 300 compensates for transmitter impairments, such as gain imbalance, phase imbalance, and DC offset. The digital compensation circuitry 300 may also receive an input signal from the baseband subsystem 110 over connection 132. The connection 132 is shown as a dotted line to indicate that it is optional. The digital compensation circuitry 300 also receives one or more control signals from the digital processing element 220, to be described below. In one embodiment, the digital processing element 220 is used during calibration to generate signals corresponding to the test points shown in FIG. 3. The digital processing element 220 receives transmitter performance signals from the radio frequency (RF) detector 250, to be described below, and generates impairment estimate signals for gain imbalance, phase imbalance and DC offset. The impairment estimate signals are provided to the digital compensation circuitry 300 via connection 222. The digital compensation circuitry 300 then compensates the transmit signals for gain imbalance, phase imbalance and DC offset based on the impairment estimates.

The output of the digital compensation circuitry 300 on connection 202 is the compensated transmit signal which is supplied to DAC 136. DAC 136 converts the transmit signal to analog form, which is the suitable input format for modulator 204 and supplies the analog transmit signal to the modulator 204 via connection 203. The modulator 204 is similar to the modulator 152 of FIG. 2. The modulator 204 modulates the compensated transmit signal and supplies, via connection 206, the transmit signal to the external power amplifier 180. A portion of the input to the power amplifier 180 is supplied to the RF detector 250 by an RF coupler 253 or other device. Depending on the manner in which the internal calibration system is implemented, the RF detector 250 can be implemented as an energy detector 260, or can be implemented as an envelope detector 275. If implemented as an envelope detector 275, the envelope detector 275 will include a modulus/rectifier function 272 followed by a low-pass filter 274. Because implementing an energy detector at radio frequency is a non-trivial task, it may be desirable to implement the envelope detector 275. Implementing the internal calibration system using either the energy detector 260 or the envelope detector 275 will be described below.

The output of the RF detector 250 is supplied as feedback via connection 216 to an analog-to-digital converter (ADC) 218. The ADC 218 digitizes the output of the RF detector and supplies the feedback signal to the digital processing element 220. The digital processing element 220 generates a signal corresponding to the desired test points (FIG. 3) and supplies an output via connection 222 as both data input to the digital compensation circuitry 300 and as control input to the digital compensation circuitry 300. Based on the output of the digital processing element 220, the digital compensation circuitry 300 corrects gain imbalance, phase imbalance, and/or DC offset. The modulated transmit output signal of the modulator 204 is supplied via connection 206 to the power amplifier 180, where the signal is amplified and supplied via connection 156 to the antenna 160 for transmission. The digital processing element 220 can be implemented as a digital signal processor (DSP) located directly on the RF chip or can be the DSP 126 located in the baseband subsystem 110.

The output of the transmitter 200 can be modeled using the following equation 1.

$$RF_{out}(I,Q) = Re[I \cdot (G_{imb} \cdot e^{j \cdot \phi_{imb}}) + j \cdot Q + (DC_i + j \cdot DC_q) \cdot e^{j \cdot \omega_c t}], \qquad \text{Eq. 1}$$

where (I,Q) is the baseband input signal, $\omega_c$ is the RF carrier frequency, $G_{imb}$ is the gain imbalance, $\phi_{imb}$ is phase imbalance and $DC_{i,q}$ represent DC offsets added to the I and Q baseband signal components, and j denotes the imaginary number $\sqrt{-1}$. To accurately calibrate the RF transmitter, the impairments are measured and then compensated.

Figure 5:
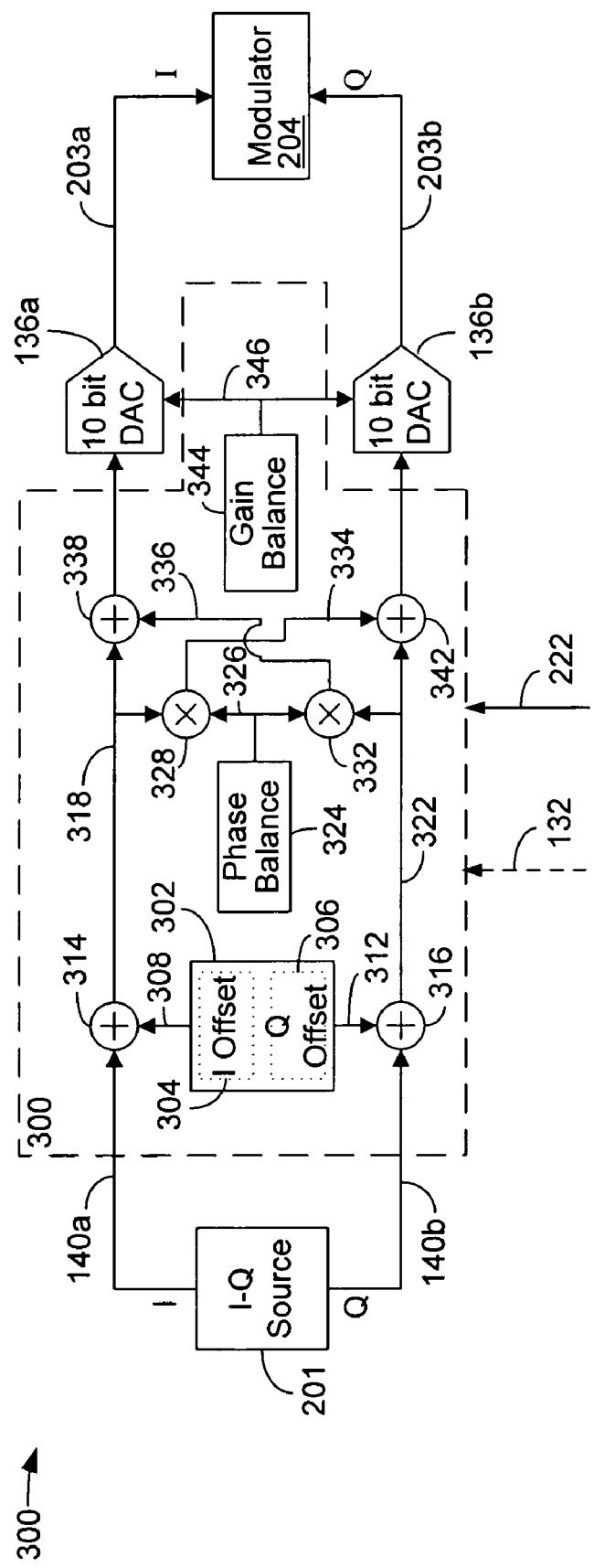
FIG. 5 is a schematic diagram illustrating the digital compensation circuitry of FIG. 4.

FIG. 5 is a schematic diagram illustrating an embodiment of the digital compensation circuitry 300 of FIG. 4. The digital compensation circuitry 300 receives the in-phase component of the transmit signal from the I-Q source 201 via connection 140a and the quadrature-phase component of the transmit signal via connection 140b. Alternatively, the digital compensation circuitry 300 receives the in-phase and quadrature phase components of the transmit signal from the digital processing element 220. The in-phase signal component on connection 140a is supplied to adder 314. The quadrature signal component on connection 140b is supplied to the adder 316. To compensate for DC offset, the offset correction element 302 comprises an in-phase offset component 304 and a quadrature offset component 306. The in-phase offset component 304 provides an in-phase DC offset compensation signal via connection 308 to the adder 314 while the quadrature offset component 306 provides a quadrature DC offset compensation signal via connection 312 to the adder 316. The input to the DC offset correction element 302 is supplied via connection 222 from the digital processing element 220 of FIG. 4, based on input from the RF detector 250.

Any phase imbalance imparted to the transmit signal is corrected by the phase balance element 324. The phase balance element 324 provides a phase compensation signal via connection 326 to the multipliers 328 and 332. The output of the adder 314 is supplied via connection 318 as the in-phase input to the multiplier 328, while the output of the adder 316 on connection 322 is supplied as the input to the multiplier 332. The signals on connections 318 and 322 are DC offset corrected. The output of the phase balance element 324 on connection 326 is a phase correction proportionality signal, signifying how much of the I signal should be added to the Q signal, and how much of the Q signal should be added to the I signal, to correct any phase imbalance. These proportions of the I and Q signal appear, respectively, on connections 334 and 336, after multiplication of the signals on connections 318 and 322 by multipliers 328 and 332, respectively.

The in-phase signal on connection 318 is also supplied to adder 338 while the quadrature signal on connection 322 is supplied to the adder 342. The output of the adder 338 is an in-phase DC offset corrected, phase-balanced signal component and the output of the adder 342 is the quadrature DC offset compensated, phase-balanced signal component. The phase balance element 324 also receives its input from the digital processing element 220 of FIG. 4, based on the output of the RF detector 250. The gain balance element 344 provides a gain balance signal on connection 346 to a digital-to-analog converter 136a and a digital-to-analog converter 136b. The digital-to-analog converters 136a and 136b can be implemented with, for example, a 10 bit resolution. The output of the DAC 136a on connection 203a is an in-phase, gain balanced, phase balanced DC offset compensated component of the transmit signal and the output of the DAC 136b on connection 203b is a quadrature, gain balanced, phase balanced DC offset corrected component of the transmit signal. These signals are supplied to the modulator 204 for modulation and subsequent up-conversion.

Figure 6:
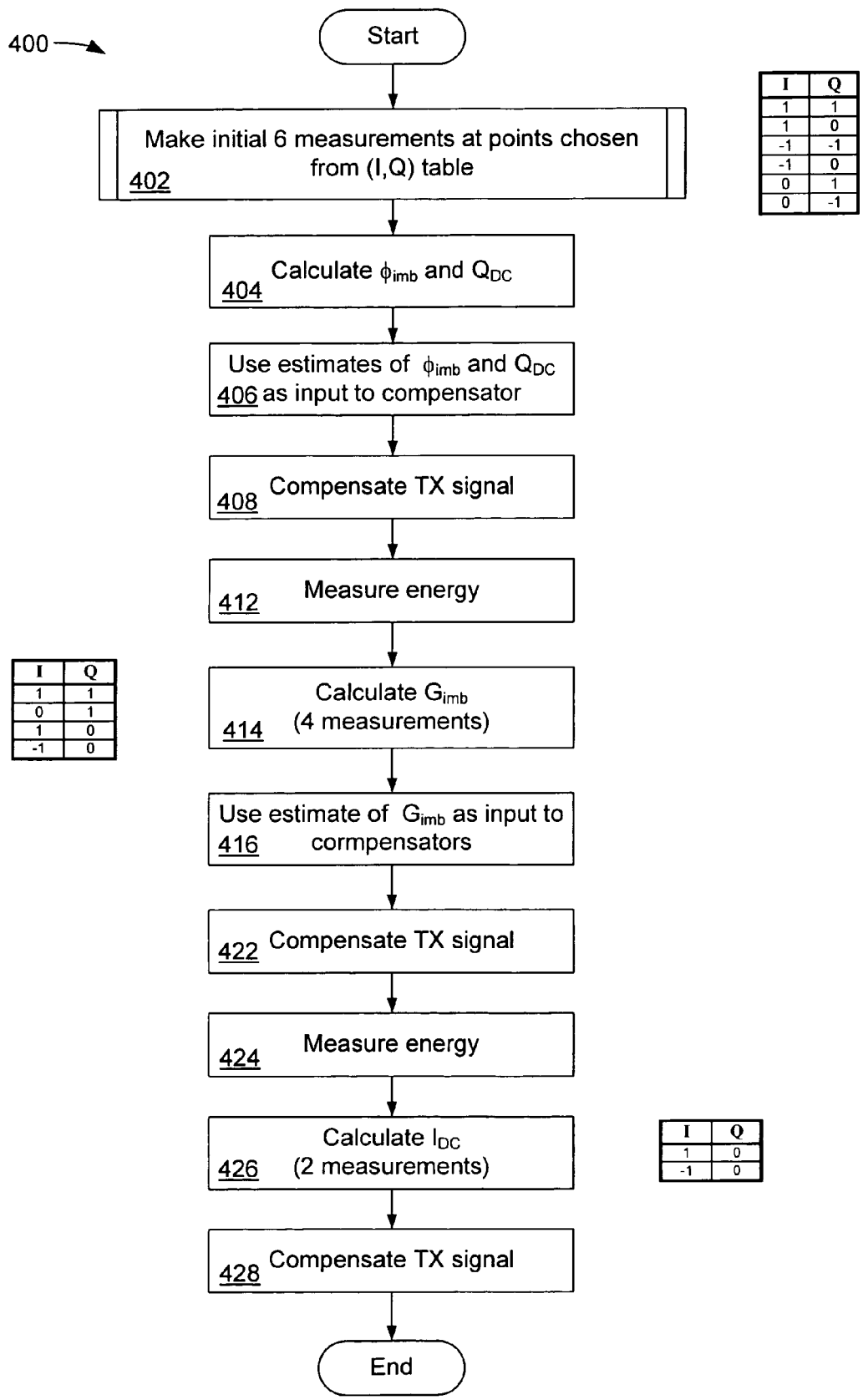
FIG. 6 is a flowchart illustrating the operation of an embodiment of the internal calibration system, when implemented using an energy detector as the RF detector.

FIG. 6 is a flowchart 400 illustrating the operation of an embodiment of the internal calibration system, when implemented using an energy detector 260 as the RF detector. The steps in the flowchart of FIG. 6 and the flowcharts of FIGS. 7A, 7B and 8 may be implemented in the order shown, out of the order shown, or substantially in parallel. Further, the steps in the flowcharts illustrate embodiments of the internal calibration system. Other steps that perform the same functions may also be used. The energy detector 260 estimates the energy of the RF signal and converts the energy measurement to a DC level output. The DC output can be modeled in terms of the input (I, Q) as follows in equation 2.

$$E(I,Q) = (I+I_{DC})^2(1+(G_{imb}^2-1)\cos^2(\phi_{imb}))+(Q+Q_{DC})^2 + 2(I+I_{DC})(Q+Q_{DC})\sin(\phi_{imb}),  \quad \text{Eq. 2}$$

By evaluating the function in Eq. 2 at the four points where the unit circle intersects the in-phase and quadrature-phase axes (FIG. 3.) and also at two additional points where the in-phase and quadrature-phase components are both set to the same maximum amplitude, the following relationships may be obtained.

$$E(1, 0) = \quad \text{Eq. 3}$$
$$(1 + 2I_{DC})(1 + (G_{imb}^2 - 1)\cos^2(\phi_{imb})) + 2Q_{DC}\sin(\phi_{imb}) + E(0, 0)$$

$$E(-1, 0) = \quad \text{Eq. 4}$$
$$(1 - 2I_{DC})(1 + (G_{imb}^2 - 1)\cos^2(\phi_{imb})) - 2Q_{DC}\sin(\phi_{imb}) + E(0, 0)$$

$$E(0, 1) = 1 + 2Q_{DC} + 2I_{DC}\sin(\phi_{imb}) + E(0, 0) \quad \text{Eq. 5}$$

$$E(0, -1) = 1 - 2Q_{DC} - 2I_{DC}\sin(\phi_{imb}) + E(0, 0) \quad \text{Eq. 6}$$

$$E(1, 1) = (1 + 2I_{DC})(1 + (G_{imb}^2 - 1)\cos^2(\phi_{imb})) + 2(Q_{DC} - 1) \quad \text{Eq. 7}$$
$$\sin(\phi_{imb}) + E(0, 1) = 1 + 2Q_{DC} + (2I_{DC} + 1)\sin(\phi_{imb}) + E(1, 0)$$

$$E(-1, -1) = \quad \text{Eq. 8}$$
$$(1 - 2I_{DC})(1 + (G_{imb}^2 - 1)\cos^2(\phi_{imb})) - (2Q_{DC} - 1)\sin(\phi_{imb}) + $$
$$E(0, -1) = 1 - 2Q_{DC} - (2I_{DC} - 1)\sin(\phi_{imb}) + E(-1, 0)$$

In block 402, an initial six energy measurements are made using the above equations at points chosen from the (I,Q) table shown to the right of block 402 in FIG. 6. In this example, and referring to FIG. 3, the six points at which the initial energy measurements are made are points 188 (1,0), 189 (1,1), 192 (0,1), 196 (0,−1), 197 (−1, −1), and 198 (−1,0).

In block 404, using the energy measurements obtained in block 402, the phase imbalance and the DC offset for the quadrature component are calculated by the digital processing element 220 using equations 9 and 10, respectively.

$$\sin(\phi_{imb}) = \frac{E(1, 1) - E(1, 0) + E(-1, -1) - E(-1, 0) - 2}{4} \approx \phi_{imb} \quad \text{Eq. 9}$$

$$Q_{DC} = \frac{E(0, 1) - E(0, 1)}{4} \quad \text{Eq. 10}$$

As shown in Eq. 9, it is possible to use the sine of the phase imbalance as a general estimate for the total phase imbalance because the total phase imbalance is likely to be a small value.

In block 406, the estimates of the phase imbalance and the quadrature DC offset obtained in block 404 are used as input via connection 222, to the digital compensation circuitry 300 (FIG. 4.). These estimates of phase imbalance and quadrature DC offset are generated by the digital processing element 220, in conjunction with implementing the energy detection software 270 (FIG. 2) and the transmit compensation software 265 (FIG. 2), and supplied via connection 222 as input to the digital compensation circuitry 300. Specifically, the estimate of the phase imbalance, as processed by the digital processing element 220, is supplied to the phase balance element 324 in the digital compensation circuitry 300. Similarly, the estimate of the quadrature DC offset is processed by the digital processing element 220 and supplied to the quadrature offset element 306 in the digital compensation circuitry 300 (FIG. 5).

In block 408, the digital compensation circuitry 300 compensates the transmit signal by removing, or substantially reducing, the phase imbalance and the quadrature DC offset.

In block 412, the energy detector 260 and the digital processing element 220 use Eq. 2 to measure the energy of the output of the modulator 204. However, Eq. 2 is simplified in this step because the phase imbalance and the quadrature DC offset components are set to zero.

In block 414, the digital processing element 220 calculates the gain imbalance by taking measurements at the points 188, 189, 192, and 198 (FIG. 3) and using equation 11 below to calculate the gain imbalance.

$$G_{imb} = \sqrt{E(1, 1) - E(0, 1) - \left(\frac{E(1, 0) - E(-1, 0)}{2}\right)} \quad \text{Eq. 11}$$

In block 416, the estimate of the gain imbalance calculated in block 414 is supplied to the digital compensation circuitry 300 of FIGS. 4 and 5. Specifically, the output of the digital processing circuitry 220 is supplied to the gain balance element 344 so that the gain imbalance can be compensated in block 422. In block 422, the gain imbalance is removed or substantially reduced.

In block 424, the energy detector 260 and the digital processing element 220 again measure the output energy of the modulator 204 using Eq. 2, which is further simplified because the gain imbalance variable $G_{imb}$ is now set to one.

In block 426, the in-phase DC offset is measured at points 188 and 198 (FIG. 3), and calculated by the digital processing element 220 using equation 12.

$$I_{DC} = \frac{E(1, 0) - E(-1, 0)}{4} \quad \text{Eq. 12}$$

In block 428, the transmit signal is compensated by the digital processing circuitry 220 supplying a signal to the in-phase offset element 304 of FIG. 5 to remove or substantially reduce any DC offset from the in-phase component of the transmit signal.

Figure 7A:
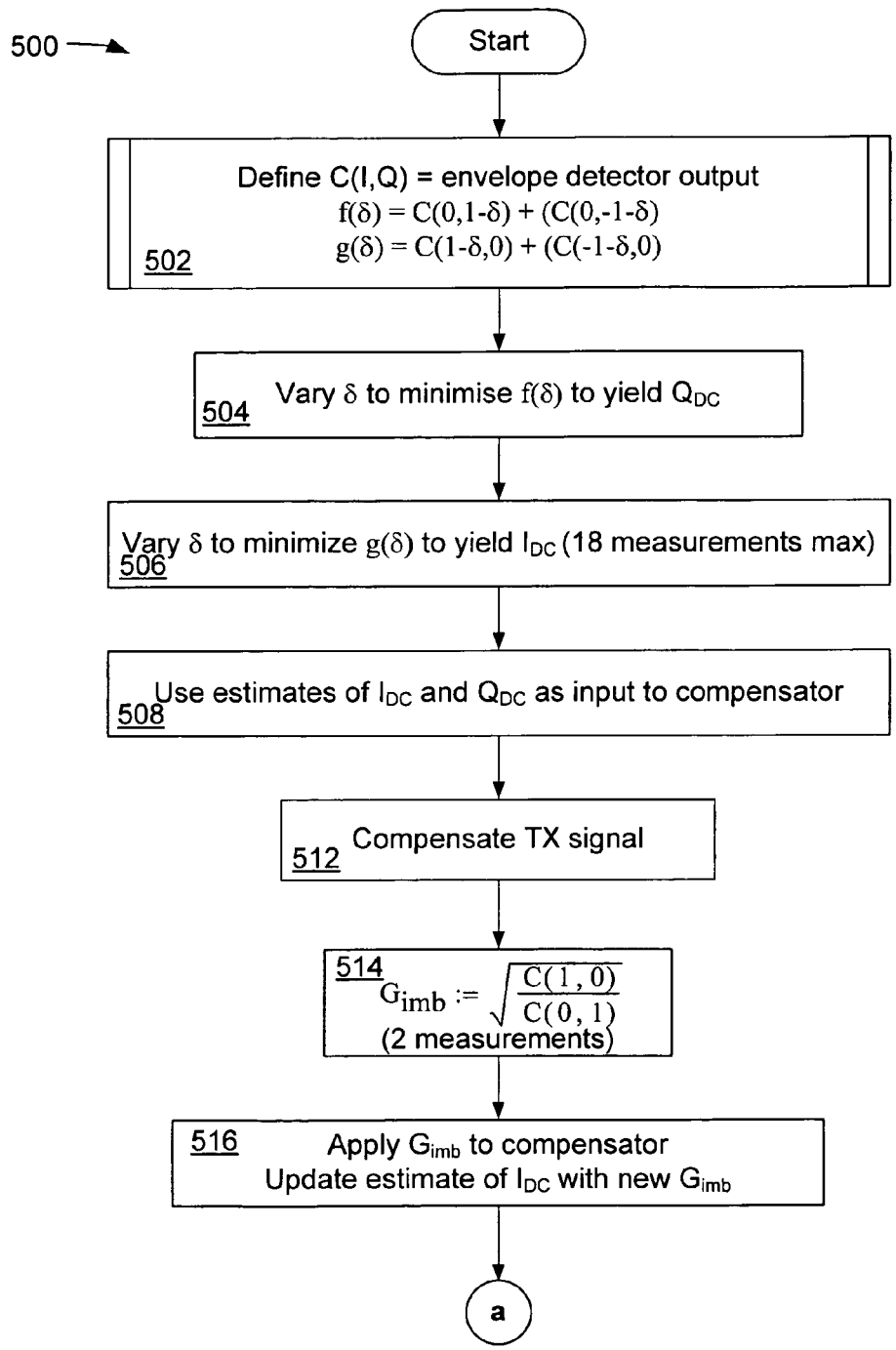
FIGS. 7A and 7B are flowcharts collectively illustrating an embodiment of the operation of the internal calibration system when implemented using an envelope detector as the RF detector.
Figure 7B:
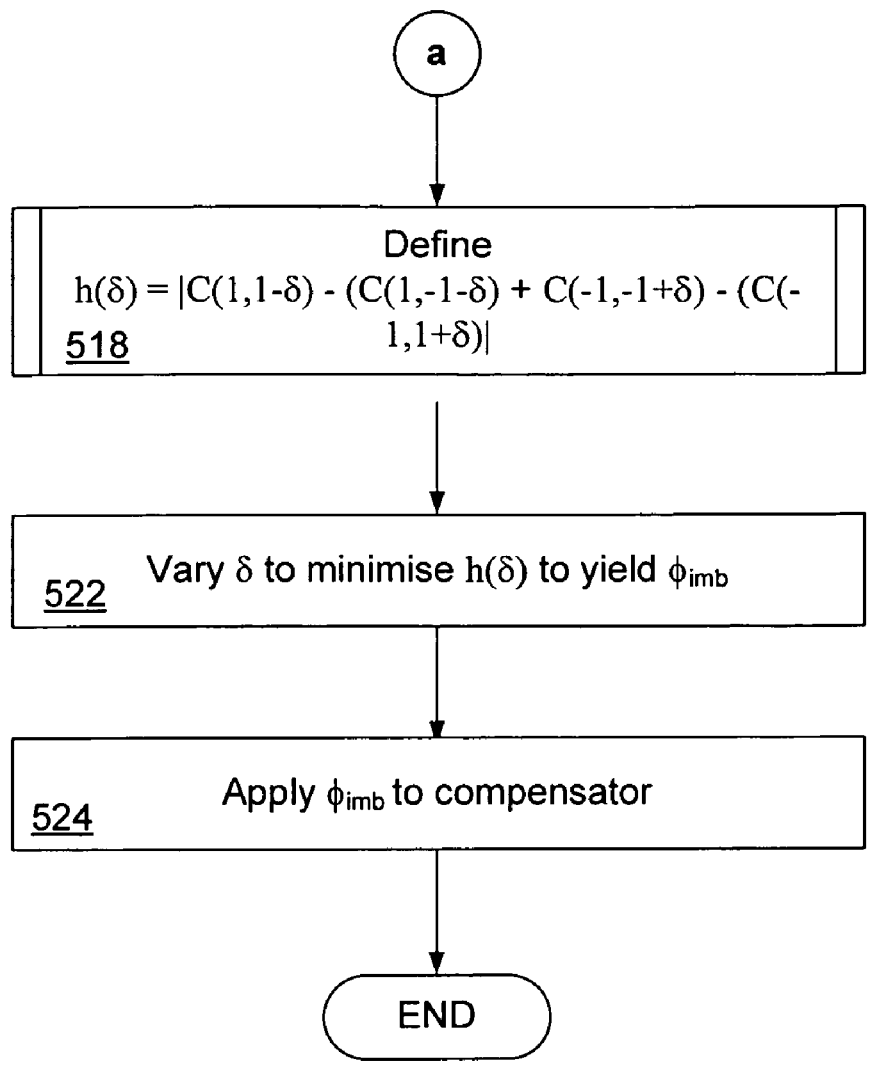

FIGS. 7A and 7B are flowcharts 500 collectively illustrating an embodiment of the operation of the internal calibration system when implemented using an envelope detector 275 as the RF detector 250. An envelope detector 275 can be modeled as an ideal rectifier (i.e., a modulus/rectifier function 272 followed by a low-pass filter 274 (FIG. 4)). The presence of the modulus/rectifier function 272, which provides an output independent of the polarity of the input, makes the envelope detector less practically challenging to implement than the energy detector. The modulus/rectifier function, represented as element 272 in FIG. 4, provides an even function, which can be approximated using a Taylor series expansion. This Taylor series expansion contains only even order components and the approximation is illustrated using equation 13.

$$|x| \approx \lim_{N \to \infty} \left( \sum_{k=1}^{N} c_k \cdot x^{2 \cdot k} \right) \qquad \text{Eq. 13}$$

Where $c_k$ are the coefficients of the Taylor series, which are only used to illustrate properties of the modulus function but are not required to be computed here.

The effect of the modulus/rectifier function 272 (FIG. 4) on a quadrature signal, y, modulated onto an RF carrier, can be shown below beginning with equation 14.

$$y = Re[(I+jQ)e^{j\omega_c t}] = I\cos(\omega_c t) - Q\sin(\omega_c t) \qquad \text{Eq. 14}$$

Using the Taylor series approximation and noting that high order frequency components are removed by the low-pass filter 274 (FIG. 4), the first order component of the output is proportional to:

$$y^2 = I^2 + Q^2 - \frac{IQ}{2}\sin(2\omega_c t) = I^2 + Q^2 = E \qquad \text{Eq. 15}$$

Similarly, the second order component of the output is proportional to:

$$y^4 = E^2 - EIQ\sin(2\omega_c t) + \frac{(IQ)^2}{4}\sin^2(\omega_c t) = E^2 + \frac{(IQ)^2}{8} \qquad \text{Eq. 16}$$

By extrapolating equations 15 and 16 to higher order terms, it is possible to express the output of the envelope detector 275, where F represents a positive function, as:

$$|I\cos(\omega_c t) - Q\sin(\omega_c t)| = F(I^2 + Q^2, (IQ)^2) \qquad \text{Eq. 17}$$

The output of the envelope detector 275 can therefore be considered as a function of $I^2 + Q^2$ and $(IQ)^2$. This indicates that when either the I component or the Q component is zero, the output of the envelope detector will monotonically increase with an increase in the remaining non-zero input. This property is used to develop a minimization strategy, described below in FIG. 8, which will converge and yield the gain imbalance, phase imbalance, and DC offset impairments from the transmitter 200.

In block 502, the output of the envelope detector is defined as the function C (I,Q). The envelope detector 275 has a monotonic relationship between input and output. The following two functions are used to define the envelope detector output, in situations where the in-phase component is zero and where the quadrature-phase component is zero, respectively. The two functions are:

$$f(\delta) = C(0, 1-\delta) + C(0, -1-\delta); \text{ and}$$

$$g(\delta) = C(1-\delta, 0) + C(-1-\delta, 0).$$

In block 504, δ is varied to minimize f(δ) to yield the estimate of the quadrature DC offset term $Q_{DC}$.

Figure 8:
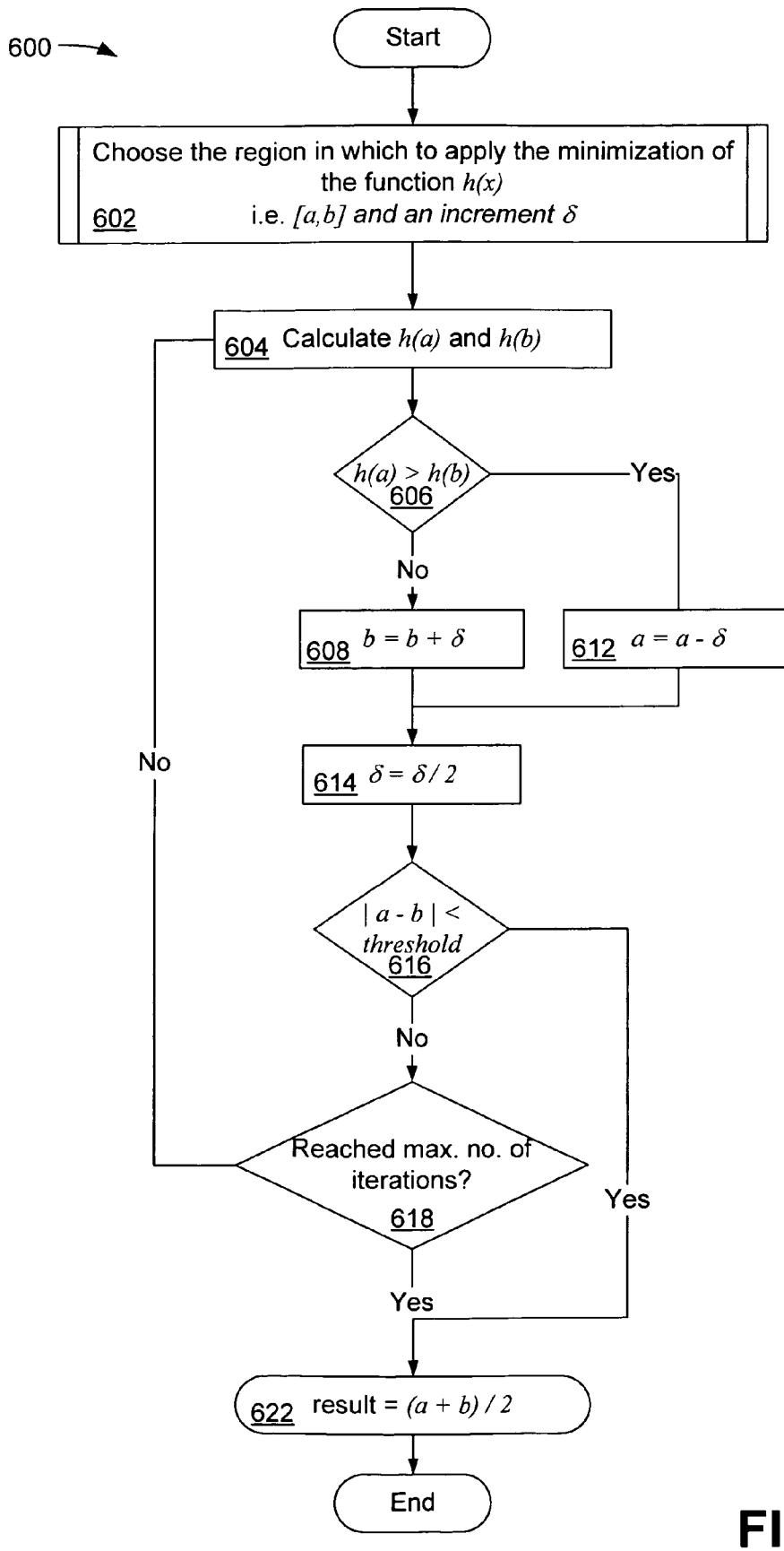
FIG. 8 is a block diagram illustrating an embodiment of the minimization algorithm/process used when the internal calibration system is implemented using the envelope detector.

FIG. 8 is a block diagram 600 illustrating an embodiment of the minimization algorithm/process used when the internal calibration system is implemented using the envelope detector 275. The minimization algorithm/process described below is one example of an efficient way of finding the minimum value for the above functions. Other algorithmic/process approaches could be used. In block 602, the region in which to carry out the minimization of the function h(x) (i.e.,[a, b] with an increment δ) is chosen. The argument to the function h (ie., the input x) is used as a symbolic representation of the input to h( ). The values a and b define the boundaries of the range over which δ is varied in order to find where h(δ) is minimized. As the minimization algorithm/process is begun, initial values for a and b are chosen. The function h( ) is evaluated at each of these two points a and b. Accordingly, in block 604, h(a) and h(b) are calculated.

In block 606, it is determined whether the function h(a) is greater than the function h(b). If the value of the function h(a) is greater than the value of the function h(b), then in block 612, the value of a is decremented by the value δ. If the value of the function h(a) is not greater than the value of the function h(b), then in block 608, the value for b is incremented by the value δ. In block 614, the value for δ equals δ/2. Essentially, in blocks 608 and 612, new values for a and b are generated that define a new, smaller region where the minimization algorithm/process estimates where the minimum value of h( ) can be found. The initial value for δ will normally be a fraction of the difference between a and b as shown in block 614. In block 616, it is determined whether the absolute value of a-b is less than a threshold value. A threshold could be set by the accuracy limits of the ADC 218 (FIG. 4). Alternatively, a threshold could be determined by the desired level of impairment reduction, or by the resolution of the digital compensation circuitry 300. If in block 616, the absolute value of a-b is less than the threshold, then the process proceeds to block 622 where the result of the minimization is (a+b)/2. If the absolute value of a-b is not less than the threshold, then, in block 618 it is determined whether the maximum number of iterations has been reached. If the maximum number of iterations has been reached, then the process proceeds to block 622. If the maximum number of iterations has not been reached, the process returns to block 604 to repeat.

With each step of the minimization algorithm/process shown in FIG. 8, new values for a and/or b are generated, which shows that the range in which the minimum value of h( ) can be found is progressively being reduced. When the absolute value of a-b is sufficiently small (i.e., the range has been sufficiently reduced) then because it is known that the minimum of h( ) exists in the range [a:b], it can be determined that the minimum value has been determined within an acceptable margin of error. The minimum value of h( ) is calculated as being at the midpoint of the range [a:b]. It is known that the minimum is in this region because the function h(x) has a single global minimum. The minimization algorithm/process described in FIG. 8 is merely one example of a class of algorithms that finds a minimum point. For example, it would be possible to start at point a, calculate f(a) then f(a+δ), f(a+2δ), f(a+3δ) ... f(b) and pick the minimum of all measured values This would be less efficient than described above, in that it would require a greater number of measurements, but it would be effective.

Returning to FIG. 7A, in block 506, the value δ is varied to minimize g(δ) to yield the estimate of the in-phase DC offset.

In block 508, the estimates of the in-phase DC offset and the quadrature DC offset are provided to the digital compensation circuitry 300 so that the in-phase offset element 304 and the quadrature offset element 306 can compensate for any DC offset on the signals on connections 140a and 140b (FIG. 5). In block 512, the in-phase DC offset and the quadrature-phase DC offset are compensated.

In block 514, the gain imbalance is calculated as $$G_{imb} := \sqrt{\frac{C(1, 0)}{C(0, 1)}} \qquad \text{Eq. 18}$$

In block 516, the estimate of the gain imbalance is supplied from the digital processing circuitry 220 to the digital compensation circuitry 300, and in particular, to the gain balance element 344 in order to compensate the gain imbalance of the transferred signal. In addition, the estimate of the in-phase DC offset is updated with the new gain imbalance estimate. In block 518 (FIG. 7B), the function $h(\delta)=|C(1, 1-\delta)-(C(1, -1-\delta)+C(-1, -1+\delta)-(C(-1, 1+\delta)|$ is defined.

In block 522, the minimization algorithm/process shown in FIG. 8 is used to vary δ to minimize the function h(δ) to yield the phase imbalance estimate. In block 524, the estimate of the phase imbalance is supplied from the digital processing element 220 to the phase balance element 324 of the digital compensation circuitry 300.

While various embodiments of the invention have been described, it will be apparent to those of ordinary skill in the art that many more embodiments and implementations are possible that are within the scope of this invention. Accordingly, the invention is not to be restricted except in light of the attached claims and their equivalents.

What is claimed is:

1. A method for internally calibrating a radio frequency (RF) transmitter, comprising:
    generating within a radio frequency (RF) transmitter a first set of test points at which an output of the RF transmitter is measured, wherein each member of the first set of test points resides along a perimeter of a square trajectory in an in-phase and quadrature phase signal space, a subgroup of the test points located at respective corners of the square trajectory;
    measuring the radio frequency output of the RF transmitter at the first set of test points;
    generating estimates of a phase imbalance and a DC offset in a quadrature dimension from the radio frequency output of the RF transmitter;
    applying the estimates of the phase imbalance and the DC offset in the quadrature dimension to a compensator;
    measuring the radio frequency output of the RF transmitter resulting from applying the estimates to the compensator at a second set of test points, the second set of test points being a subset of the first set of test points and including a single member from the subgroup of test points;
    calculating a gain imbalance resulting from measuring the radio frequency output of the RF transmitter resulting from applying the second set of test points;
    applying the gain imbalance to the compensator;
    measuring the radio frequency output of the RF transmitter resulting from applying the gain imbalance to the compensator;
    calculating a DC offset in an in-phase dimension from measuring the radio frequency output of the RF transmitter resulting from applying a third set of test points, the third set of test points being a subset of the first set of test points and a subset of the second set of test points; and
    compensating for the measured DC offset in the in-phase dimension.

2. The method of claim 1, wherein measuring the radio frequency output of the RF transmitter is accomplished using an energy detector.

3. The method of claim 1, wherein the first and second sets of test points are generated using a transmitter output scaled by a scaling factor.

4. The method of claim 3, wherein the scaling factor is unity.

5. The method of claim 1, wherein the first set of test points comprises six test points.

6. The method of claim 1, wherein the second set of test points comprises four test points.

7. The method of claim 1, wherein the third set of tests points comprises two test points.

8. An internal calibration system for a radio frequency (RF) transmitter, comprising:
    a digital processing element to generate within a radio frequency (RF) transmitter a set of test points at which an output of the RF transmitter is measured, wherein each member of the set of tests points resides along a perimeter of a square trajectory in an in-phase and quadrature phase signal space, a subgroup of test points located at respective corners of the square trajectory;
    an RF detector to measure the radio frequency output of the RF transmitter at the test points, the digital processing element also determining transmitter impairments by analyzing the measured radio frequency output, wherein analyzing comprises evaluating the output of the RF transmitter at the test points; and
    compensation circuitry to compensate the RF transmitter for the transmitter impairments.

9. The system of claim 8, wherein the RF detector is implemented using an energy detector.

10. The system of claim 9, wherein the digital processing element generates the test points using a transmitter output scaled by a scaling factor.

11. The system of claim 10, wherein the scaling factor is unity.

12. The system of claim 8, wherein the first compensation step is responsive to six measurements of the output of the RF transmitter corresponding to six test points.

13. The system of claim 8, wherein the second compensation step is responsive to four measurements of the output of the RF transmitter corresponding to four test points.

14. The system of claim 8, wherein the third compensation step is responsive to two measurements of the output of the RF transmitter corresponding to two test points.

15. A portable transceiver having an internal calibration system for a radio frequency (RF) transmitter, comprising:
    transmit and receive circuitry;
    a digital processing element to generate within a radio frequency (RF) transmitter a set of test points at which an output of the RF transmitter is measured, wherein each member of the first set of test points resides along a perimeter of a square trajectory in an in-phase and quadrature phase signal space, a subgroup of test points located at respective corners of the square trajectory;
    an RF detector to measure the radio frequency output of the RF transmitter at the test points, the digital processing element also determining transmitter impairments by analyzing the measured radio frequency output, wherein analyzing comprises evaluating the output of the RF transmitter at test points; and
    compensation circuitry to compensate the RF transmitter for the transmitter impairments.

* * * * *